Nov. 21, 1967  A. FERRI  3,353,405
WIND TUNNEL NOZZLE STRUCTURE
Filed May 11, 1965  2 Sheets-Sheet 2

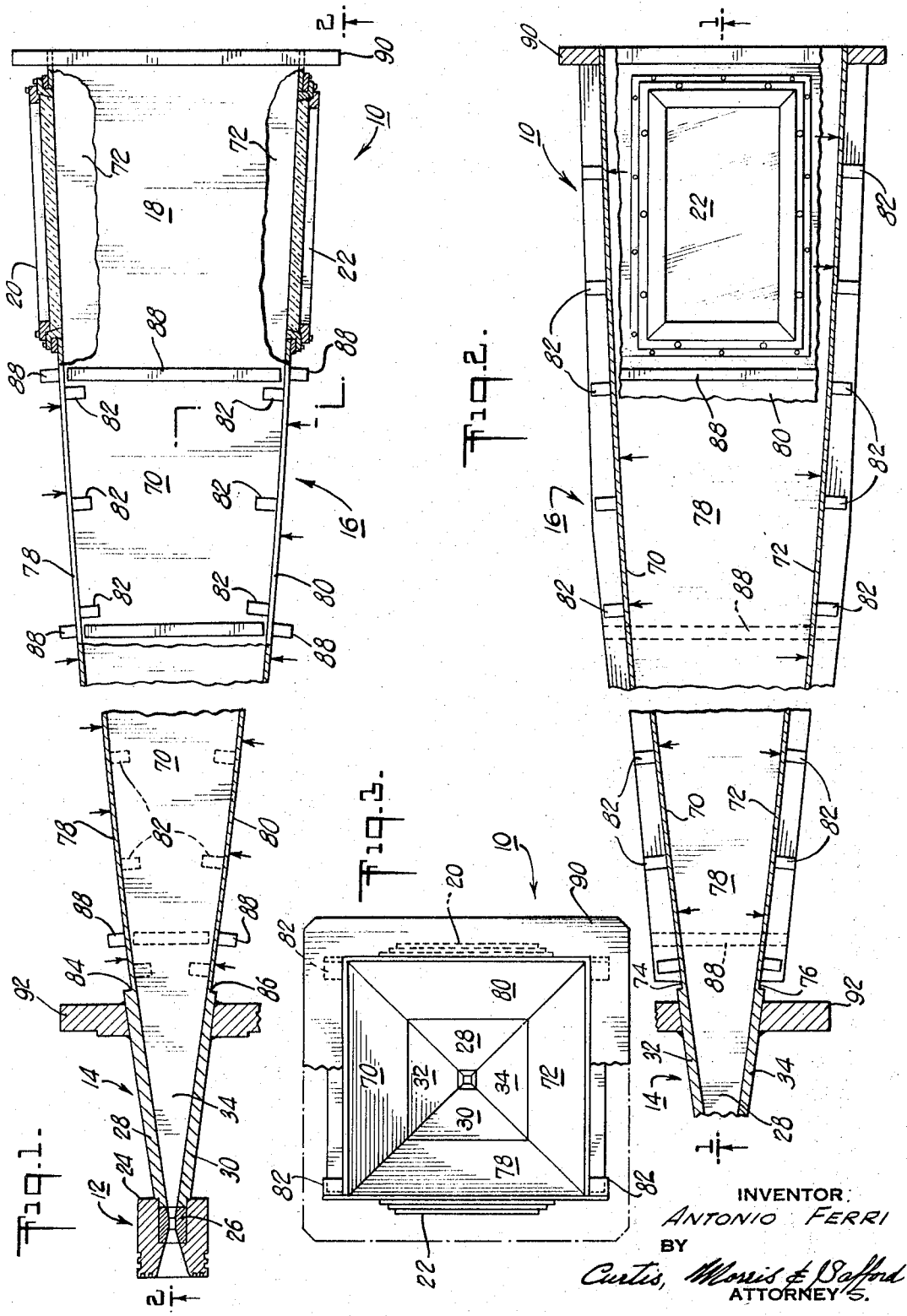

INVENTOR:
ANTONIO FERRI
BY
Curtis, Morris & Safford
ATTORNEYS.

United States Patent Office 3,353,405
Patented Nov. 21, 1967

3,353,405
WIND TUNNEL NOZZLE STRUCTURE
Antonio Ferri, Rockville Centre, N.Y., assignor to General Applied Science Laboratories, Inc., Westbury, N.Y., a corporation of New York
Filed May 11, 1965, Ser. No. 454,837
8 Claims. (Cl. 73—147)

ABSTRACT OF THE DISCLOSURE

A wind tunnel nozzle structure of reduced cost which is suitable for use in producing hypersonic speed gas flow. The tunnel has relatively inexpensive walls formed from plates with flat surfaces opposing one another from the nozzle throat to the exit. The cross-sectional shape of this flat-walled portion of the tunnel is everywhere symmetrical with respect to the longitudinal axis of the tunnel. Thus, the area ratio of the tunnel can be high enough to give hypersonic flow without the close machining tolerances required at the throat in previous nozzles. The throat of the nozzle is formed in a separate unit which is removable from the tunnel assembly so as to make it easily replaceable, and in order to facilitate assembly of the tunnel components. The diverging tunnel portion preferably is of diverging-parallel shape, with the plates being contoured and bent together to form this shape.

---

The present invention relates to gas-accelerating nozzles such as nozzles used in wind tunnels.

Wind tunnels are structures for creating high-speed gas streams in which aerodynamic bodies such as models of missiles and aircraft wings are placed and tested. The model tested in this manner is subjected to forces similar to those to which the full-size aerodynamic body would be subjected if it were in actual flight.

Most wind tunnel nozzles create a high-speed gas stream by supplying a compressed gas, usually air, to a converging-diverging nozzle which accelerates and expands the pressurized gas, and forms it into a high-speed gas stream. The converging-diverging nozzle usually comprises an inlet section whose cross-sectional area decreases in the direction of flow through the nozzle, and a diverging outlet section, usually of relatively great length, whose cross-sectional area increases in the direction of flow through the nozzle, with a "throat" joining the converging and diverging sections.

As is well known in the high-speed gas dynamics art, the speed ultimately attained by the gas accelerated in a well-designed converging-diverging nozzle depends upon the "area ratio" of the nozzle i.e. the ratio of the cross-sectional area of the nozzle passageway at its exit to the cross-sectional area at its throat. Thus, by pre-selecting the area ratio of the nozzle, the ultimate speed of the gas can be made "transonic" (slightly greater or less than Mach 1, the speed of sound in air), or "supersonic" (substantially greater than Mach 1), or "hypersonic" (very much greater than Mach 1).

In testing modern rocket and aircraft designs, often it is necessary to produce gas streams of hypersonic velocity; for example, gas streams having a speed of around Mach 12. In order to produce such extremely high speeds the area ratio of the nozzle must be very high. A high area ratio usually is attained by making the throat area as small as possible rather than by making the exit area larger in order to make the wind tunnel test section of reasonable size and as inexpensive as possible, and in order to minimize the quantity of gas flow through the nozzle and thus minimize the required capacity of the system used to supply compressed gas to the wind tunnel.

Another feature which often is provided in wind tunnel nozzles is a "contoured" diverging nozzle section. The walls of such "contoured" sections first diverge and then change gradually to become parallel to the longitudinal axis of the nozzle. The parallel-wall portion of the nozzle section straightens the gas flow and substantially removes radially-directed flow components so that aerodynamic bodies tested in this portion of the nozzle will not be subjected to the test errors that the radial components might induce.

Several different prior art wind tunnel nozzles are known, but all such nozzles have distinct disadvantages which are greatly magnified when hypersonic-speed gas streams must be produced.

One of these prior art nozzles has frusto-conically-shaped converging and diverging sections. One serious problem with this prior art nozzle is that if the wind tunnel is of even moderate size, the cost in materials and labor for machining the conical sections of such a structure is extremely high. What is more, unless complicated and very costly machining techniques are used to form a contour in the diverging section of the nozzle, the nozzle will produce radial gas flow components which are undesirable for aerodynamic testing.

Another prior art nozzle is the so-called "two-dimensional" nozzle. Such a nozzle typically comprises two long, parallel, flat metal side-plates between which are welded a pair of contoured top and bottom plates. This nozzle has a rectangular cross-sectional shape. The contour in the top and bottom plates can be provided by expensive machining so as to produce a "fixed-Mach-number nozzle," or can be provided by using relatively thin top and bottom plates whose contours can be adjusted by use of hydraulic jacks so as to produce a variable-Mach-number nozzle.

A serious problem with both of these varieties of two-dimensional nozzles occurs when the cross-sectional area at the throat is minimized in order to maximize the area ratio of the nozzle. Since the nozzle's side plates are parallel, the throat area is minimized by making the spacing between the top and bottom plates at the throat extremely small. For example, in a typical nozzle two feet wide and having an exit opening height of two feet, the throat "height" or spacing might be only a few hundredths of an inch. This requirement for an extremely small throat height means that the top and bottom plates must be extremely flat and parallel to one another at the throat in order to prevent distortions in the gas flow through the nozzle. At such close spacings between the plate, even the slightest bulge, curve or nick in either of the plates is likely to cause substantial distortion.

In view of the above discussion, it is an object of the present invention to provide a wind tunnel nozzle which avoids all of the above-mentioned problems and yet are relatively inexpensive. Thus, it is an object of the present invention to provide relatively inexpensive wind tunnel nozzle structures with the nozzles being capable of producing gas streams with substantially parallel flow without distortion due to small imperfections at its throat.

The drawings and description that follow describe the invention and indicate some of the ways in which it can be used. In addition, some of the advantages provided by the invention will be pointed out.

In the drawings:

FIGURE 1 is a partially cross-sectional and partially broken-away plan view of a wind tunnel nozzle constructed in accordance with the present invention;

FIGURE 2 is a partially broken-away cross-sectional view taken along line 2—2 of FIGURE 1;

FIGURE 3 is a partially broken-away view of the nozzle shown in FIGURE 2 looking into the exit end of the nozzle towards the nozzle's inlet end;

Figure 4:
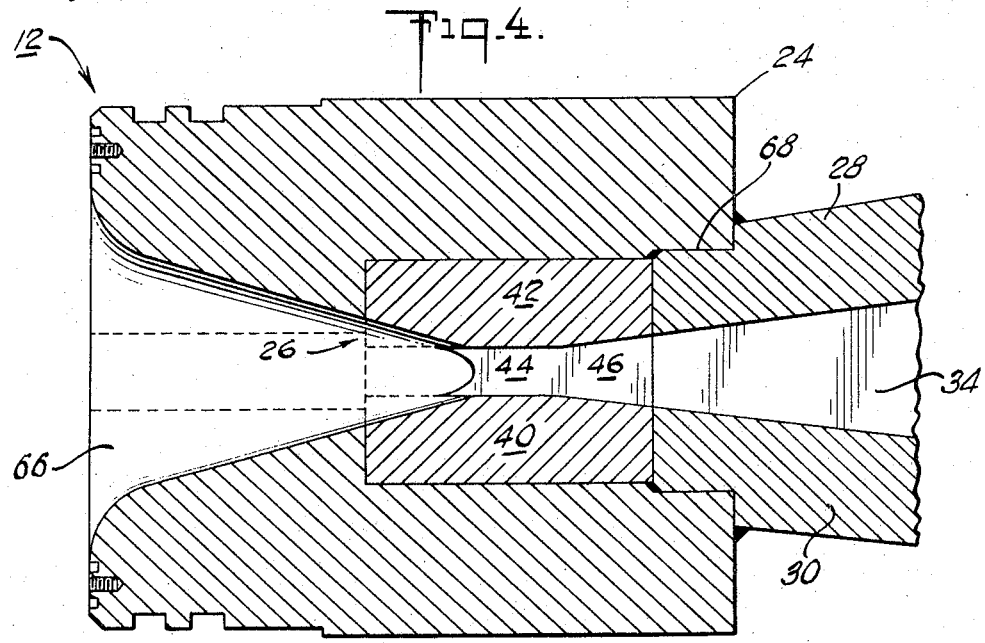
FIGURE 4 is a partially-schematic enlargement of a portion of the structure shown in FIGURE 1.

In FIGURES 1 through 3 of the drawings is shown a wind tunnel nozzle 10 constructed in accordance with the present invention. As is shown in FIGURE 1, nozzle 10 includes a throat section 12, a straight diverging section 14, and a contoured diverging section 16. Near the end of contoured section 16 is a test section 18 in which aerodynamic models can be placed for testing. The models can be viewed through side-windows 20 and 22. The cross-sectional shape of the nozzle 10 is square everywhere except in the converging portion of throat section 12. The converging section is frusto-conical and has a circular cross-section.

Highly compressed air or some other appropriate gas or combination of gases is supplied to the inlet opening of throat section 12 and typically is accelerated by the nozzle 10 to a hypersonic velocity of around Mach 12 in the test section 18. The contour of contoured diverging section 16 is "diverging-parallel"; that is, section 16 first diverges and then gradually changes to a shape which produces substantially parallel gas flow in test section 18.

Referring now to FIGURE 4 as well as FIGURES 1 and 2, the throat section 12 of nozzle 10 includes a cylindrical mounting block 24 in which is mounted a throat structure 26 and the ends of four metal plates 28, 30, 32 and 34 which form the walls of the straight diverging section 14 of the nozzle 10.

Figure 5:
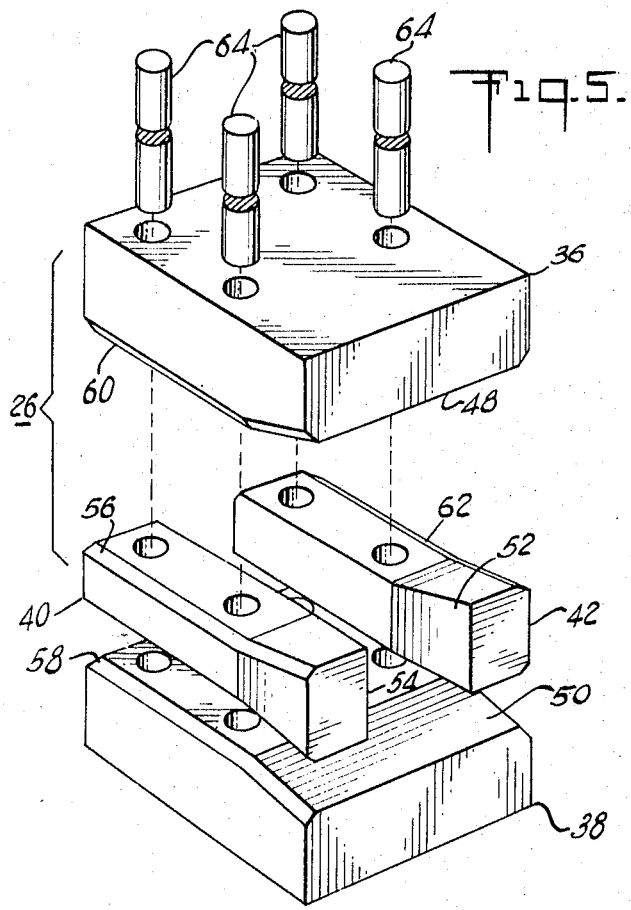
FIGURE 5 is an exploded view of a portion of the structure shown in FIGURE 4 as it appears during fabrication.
Figure 6:
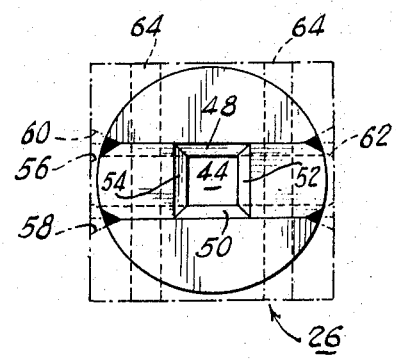
FIGURE 6 is a partially-schematic view of the structure shown in FIGURE 5, after assembly.

As is shown in FIGURES 5 and 6, the throat structure 26 is composed of four metal blocks; top and bottom blocks 36 and 38, and left and right side blocks 40 and 42. The four blocks 36, 38, 40 and 42 originally are rectangular in shape; they are machined and drilled so as to have the forms shown in FIGURE 5. Then they are assembled together so as to form a nozzle structure having a straight-walled throat 44 and a smoothly-diverging outlet section 46, each having a square cross-sectional shape.

The diverging outlet section 46 is formed by machining a gradually-sloping beveled portion 48, 50, 52 or 54, respectively, at one end of each block. Each of these beveled portions has the same length and slope. Side blocks 40 and 42 are machined further so as to have identical outwardly-sloping surfaces at the top and bottom. The slope and length of each of these surfaces are made equal to the slope and length of each beveled portion 48, 50, 52 and 54 so that the beveled portions of the blocks fit together tightly when assembled.

Certain of the outside edges of each block are machined to give each edge a relatively steep beveled portion such as beveled edge portions 56, 58, 60 and 62, so as to form deep V-shaped notches at the external joints between the blocks when they are assembled as shown in FIGURE 6.

The four blocks then are assembled by means of four pins 64 which are press-fitted into holes in the blocks, with the side blocks 40 and 42 "sandwiched" between the top and bottom blocks 36 and 38. The outwardly-flaring top and bottom surfaces of side blocks 40 and 42 fit snugly against beveled portions 48 and 50 of top and bottom blocks 36 and 38 to form a smooth gas passageway through the throat structure 26 without spaces between adjacent blocks. Then, the deep V-shaped grooves shown in FIGURE 6 are filled with weld material so as to weld and further secure the four blocks together.

The mounting block 24 must serve as a housing for the throat structure and must be capable of withstanding the high pressure of the compressed gas it receives. Therefore, housing 24 must have relatively thick walls. This fact, together with the rectangular shape of structure 26, makes it difficult to mount the throat structure in the housing. However this problem is solved rather simply and inexpensively by boring a cylindrical cavity in one end of the block 24 and shaping the exterior of structure 26 to fit into the cavity.

Referring now to FIGURE 6 the throat structure 26 is machined from its original rectangular shape (shown in dashed lines) to the cylindrical shape shown in full lines. Advantageously, since the original V-shaped welds were made quite deep, considerable weld material remains after this machining operation so as to continue to aid in securely holding the four blocks together. The cylindrical throat structure 26 then is fitted into the cylindrical cavity in mounting block 24 and is welded in place.

Referring now to FIGURE 4, a smooth frusto-conical flared inlet opening 66 is formed in the end of housing 24 opposite the end in which throat structure 26 is secured. This opening 66 is formed by a relatively easy machining step, and extends partially into throat structure 26 so as to give structure 26 a frusto-conical inlet opening which merges smoothly with the square cross-sectional throat 44. The joint between throat structure 26 and mounting block 24 is quite smooth since it is shaped in the machining of inlet opening 66. Note that the outlines of mounting block 24 and structure 26 before the inlet opening is machined are shown as dashed lines in FIGURE 4.

Referring now to FIGURES 1 and 2 as well as FIGURE 4, the four plates 28, 30, 32 and 34 are assembled together to form the straight diverging section 14. Their smallest ends then are machined to a cylindrical form at the surface indicated by numeral 68 in FIGURE 4 and the cylindrical ends are inserted into another cylindrical cavity in the exit end of block 24 so as to insure that they fit properly. Plates 28, 30, 32 and 34 are made relatively thick so that there will be sufficient material remaining in the small ends of the plates after they have been machined. The four plates 28, 30, 32 and 34 then are disassembled. Next, the ends of relatively thin top and bottom contour plates 70 and 72 are welded, respectively, to plates 32 and 34 at joints 74 and 76 (see FIGURE 2). Then the top and bottom plates 32 and 34 are reinserted into the cylindrical opening in block 24, and are welded in place.

As is shown in FIGURE 1, top and bottom plates 70 and 72 are cut in a contoured outline such as to give the diverging contoured nozzle section 16 the "diverging-parallel" shape desired. These relatively thin top and bottom plates may be cut to shape relatively easily and inexpensively by conventional techniques.

Next, two non-contoured side-plates 78 and 80 are cut out of flat metal having approximately the same thickness as the top and bottom plates 70 and 72. Holes are cut for viewing windows 20 and 22, and metal blocks 82 are welded to the side plates 78 and 80 along contour lines the same as those of the edges of the top and bottom plates 70 and 72.

After that, side plates 78 and 80 are welded at their small ends to plates 28 and 30 at joints 84, 86 respectively, (see FIGURE 1). Plates 28 and 30 are reinserted in the cylindrical opening at the end of block 24 and are welded in place and to the top and bottom plates 32 and 34 to complete the straight diverging section 14 of the nozzle 10.

Following these steps, all four plates 70, 72, 78 and 80 are bent to conform to one another. Bending pressure is applied to top and bottom plates 70 and 72 by hydraulic jacks acting in the directions of the arrows shown in FIGURE 2 so as to force the top and bottom plates against the blocks 82 on side plates 78 and 80. Simultaneously, bending pressure is applied to side plates 78 and 80 by means of other hydraulic jacks acting in the directions of the arrows in FIGURE 1 to bend the side plates to conform to the contour of the edges of the top and bottom plates 70 and 72. Then the top and bottom plates are welded to the blocks 82, and various side braces 88 are welded to this structure, as are an end support plate 90 and a relatively thick support plate 92 at the end of straight diverging section 15.

It should be understood that the application of bending pressure and welding of the plates to the blocks 82 advantageously is performed step-by-step in relatively short lengths starting at the small end and working towards the large end of section 16.

The advantages of nozzle 10 over known wind tunnel nozzles truly are notable. The throat 44 of the nozzle is symmetric with respect to its longitudinal axis so that the cross-sectional area of the throat may be made quite small without making either the height or width of the throat of disproportionate size. Thus, the distortion problems of the usual prior art "two-dimensional" nozzle described above are avoided.

Further avoidance of the distortion problem is provided by forming the throat structure 26 as a separate unit by means of the above-described method. By using this structure and method, the components of the throat structure 26 are made small enough to allow them to be machined and finished with great accuracy at a relatively low cost.

The nozzle 10 is considerably easier to maintain and modify than prior art nozzles. If the throat walls are damaged or worn, the whole structure 26 may be replaced without having to replace the other expensive components of the nozzle 10. What is more, the area ratio of the nozzle 10 and consequently the test section Mach number may be changed by replacing the throat structure 26 with another having different throat dimensions.

Most impressively, the nozzle 10, when constructed by the above-described method, costs only about one-third as much to make as the next-best type of nozzle giving similar performance.

The above description of the invention is intended to be illustrative and not limiting. Various changes or modifications in the embodiments described may occur to those skilled in the art and these can be made without departing from the spirit or scope of the invention as set forth in the claims. For example, it is possible to weld plates 28, 30, 32 and 34 into block 24 in any sequence desired. Similarly, the sequence of steps used in assembling plates 28, 30, 32 and 34 with plates 70, 72, 78 and 80 may be varied as desired without departing from the spirit or scope of the invention.

I claim:

1. In a wind tunnel for converting a compressed gas into a gas stream of supersonic velocity, a plurality of members with substantially flat surfaces joined together with said flat surfaces facing one another to form a gas flow passageway which has a throat and an exit opening, and which diverges from a relatively small cross-sectional area at said throat to a relatively larger cross-sectional area at said exit opening, the cross-sectional shape of said passageway being everywhere substantially symmetrical with respect to the longitudinal axis of said passageway.

2. Apparatus as in claim 1 in which said members include a first set of members forming said throat portion of said passageway and a second set of members forming the remaining portion of said passageway, said first set of members being secured to said second set so as to form a relatively smooth, continuous flow passageway from said throat to said exit opening.

3. Apparatus as in claim 2 including a body member, said first members being mounted in said body member, each of said second members having one end mounted in said body member in communication with one end of one of said first members, said throat being formed at a position upstream from the junction between said first and second members.

4. Apparatus as in claim 2 in which said first set of members comprises a plurality of blocks each having a flat surface with a beveled end portion, and means for securing said blocks together with said flat portions facing one another to form a flat-walled gas passageway having a substantially constant cross-sectional area along its length, and with said beveled end portions facing one another to form a diverging gas passageway.

5. A gas-accelerating nozzle comprising, in combination, four substantially rectilinear blocks each with a relatively gradually-beveled end portion on one surface, two of said blocks each having opposed identical outwardly-sloping surfaces of length and slope equal to the length and slope of said beveled end portion, each of said blocks having relatively steeply beveled longitudinal edges, means securing said blocks together with each of said two blocks being secured between the other two of said blocks so as to form a square cross-sectional gas passageway with a diverging exit section, said securing means including external weld beads in grooves formed by adjacent ones of said steeply-beveled edges, the external surface of the structure being formed to have a cylindrical shape, a mounting block having a cylindrical bore, said structure being secured in said bore in said mounting block, and a frusto-conically-shaped bore extending into the gas passageway of said structure to form a converging inlet gas passageway for said nozzle.

6. In a converging-diverging wind tunnel nozzle, a diverging nozzle section for expanding and accelerating gas flowing through said nozzle and forming said gas into a high-speed stream flowing in a direction substantially parallel to the longitudinal axis of said nozzle, said diverging section comprising a first pair of flat plates each shaped to have a diverging-parallel contour, a second pair of flat plates, a pair of ledges each extending outwardly from one surface of each of said second pair of plates in a diverging-parallel contour pattern, each of said first pair of plates being secured between and shaped by said second pair of plates by means of said ledges, said second pair of plates being bent to follow the contour of said first plates.

7. Apparatus as in claim 6 in which said diverging section has a rectilinear cross-sectional shape, and in which each of said ledges is formed by a plurality of blocks secured to said surface at longitudinally-spaced intervals.

8. A wind tunnel nozzle comprising, in combination, a housing with a throat structure having a square throat and a diverging section, said throat structure being composed of a plurality of blocks mounted in said housing, a converging section cut into said housing and extending into said throat section, a straight-walled diverging nozzle section formed of four flat, relatively thick plates joined together at their edges to form a square cross-sectioned gas passageway, the small end of the assembly of said four plates being machined to a cylindrical shape and secured in a cylindrical hole in said housing with said straight-walled diverging section smoothly communicating with the diverging section of said throat structure, and a contoured diverging section connected to said straight-walled diverging section and comprising a first pair of flat plates each shaped to have a diverging-parallel contour, a second pair of flat plates, a pair of ledges each extending outwardly from one surface of each of said second pair of plates in a diverging-parallel contour pattern, each of said first pair of plates being secured between and shaped by said second pair of plates by means of said ledges, said second pair of plates being bent to follow the contour of said first plates.

References Cited

UNITED STATES PATENTS

| | | | |
|---|---|---|---|
| 2,332,407 | 10/1943 | Spenle | 138—44 X |
| 2,696,110 | 12/1954 | Eggers | 73—147 |

DAVID SCHONBERG, *Primary Examiner.*